United States Patent [19]

Lo Biondo et al.

[11] 4,270,244
[45] Jun. 2, 1981

[54] METHOD AND APPARATUS FOR MACERATING MEAT

[76] Inventors: Salvatore J. Lo Biondo, 12 Decamp Ct., West Caldwell, N.J. 07006; Joseph V. Lo Biondo, 79 Winding La., Bloomfield, N.J. 07003

[21] Appl. No.: 44,755

[22] Filed: Jun. 1, 1979

Related U.S. Application Data

[63] Continuation of Ser. No. 866,630, Jan. 3, 1978, abandoned.

[51] Int. Cl.³ .............................................. A22C 9/00
[52] U.S. Cl. .......................................... 17/52; 17/26
[58] Field of Search ...................... 17/26, 25, 27–31, 17/45, 52

[56] References Cited

U.S. PATENT DOCUMENTS

| | | | |
|---|---|---|---|
| 315,723 | 4/1885 | Carter | 17/26 |
| 2,420,549 | 5/1947 | McKee et al. | 17/26 |
| 2,583,199 | 1/1952 | Bakewell | 17/26 |

*Primary Examiner*—Willie G. Abercrombie
*Attorney, Agent, or Firm*—Flehr, Hohbach, Test, Albritton & Herbert

[57] ABSTRACT

A method for macerating meat in which a pair of contra-rotating shafts each serve to mount a plurality of slotted discs with blunted peripheral edges, spaced apart by crushers which engage and compact pieces of meat intruded between the shafts while discs mounted on the shafts perform a slitting function; the apparatus which performs the process includes a pair of rotating shafts each carrying slotted discs with blunted peripheral edges separated from each other by crushers. The slotted discs rotate at different rates to enhance maceration by tearing.

15 Claims, 4 Drawing Figures

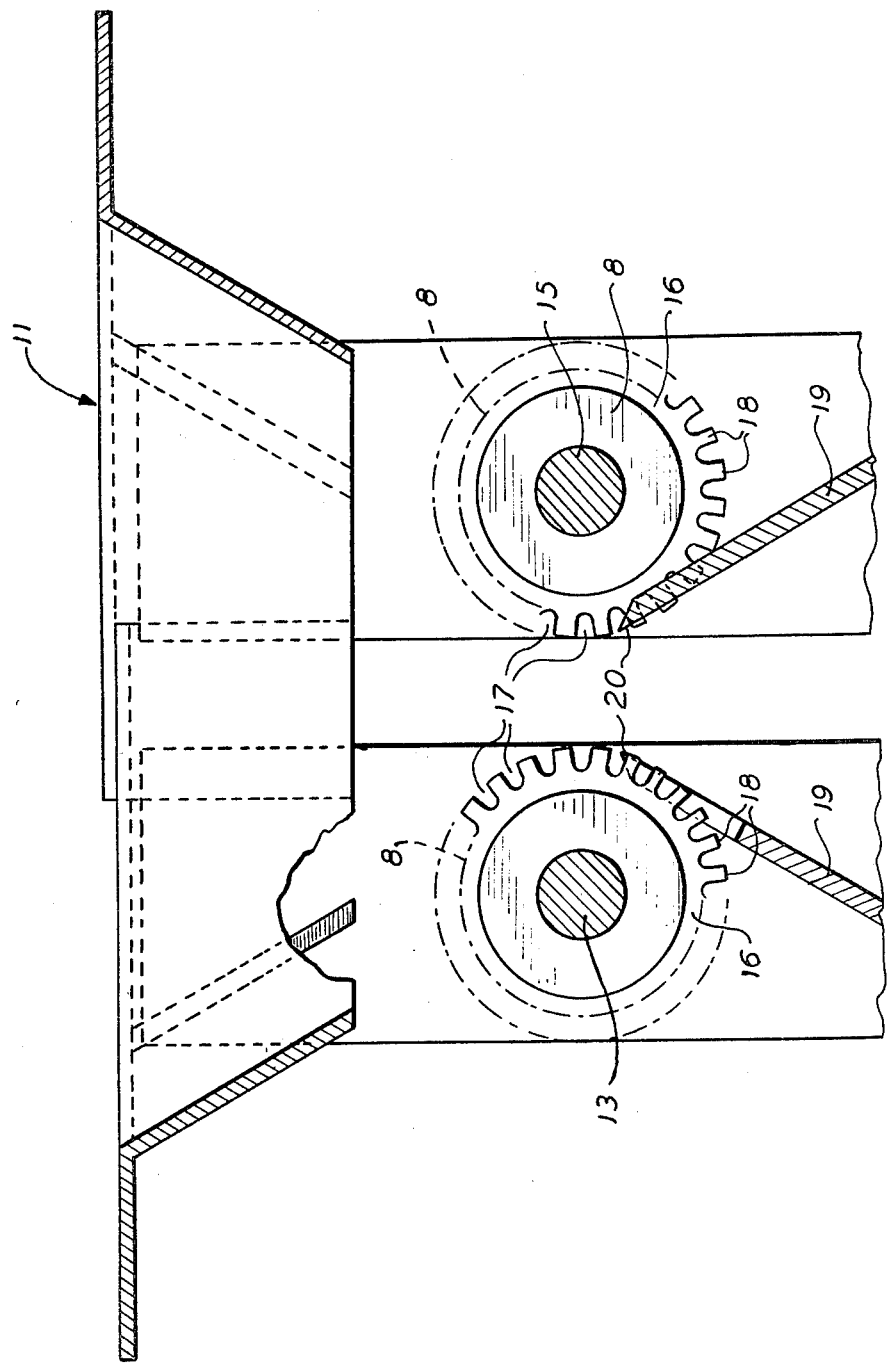

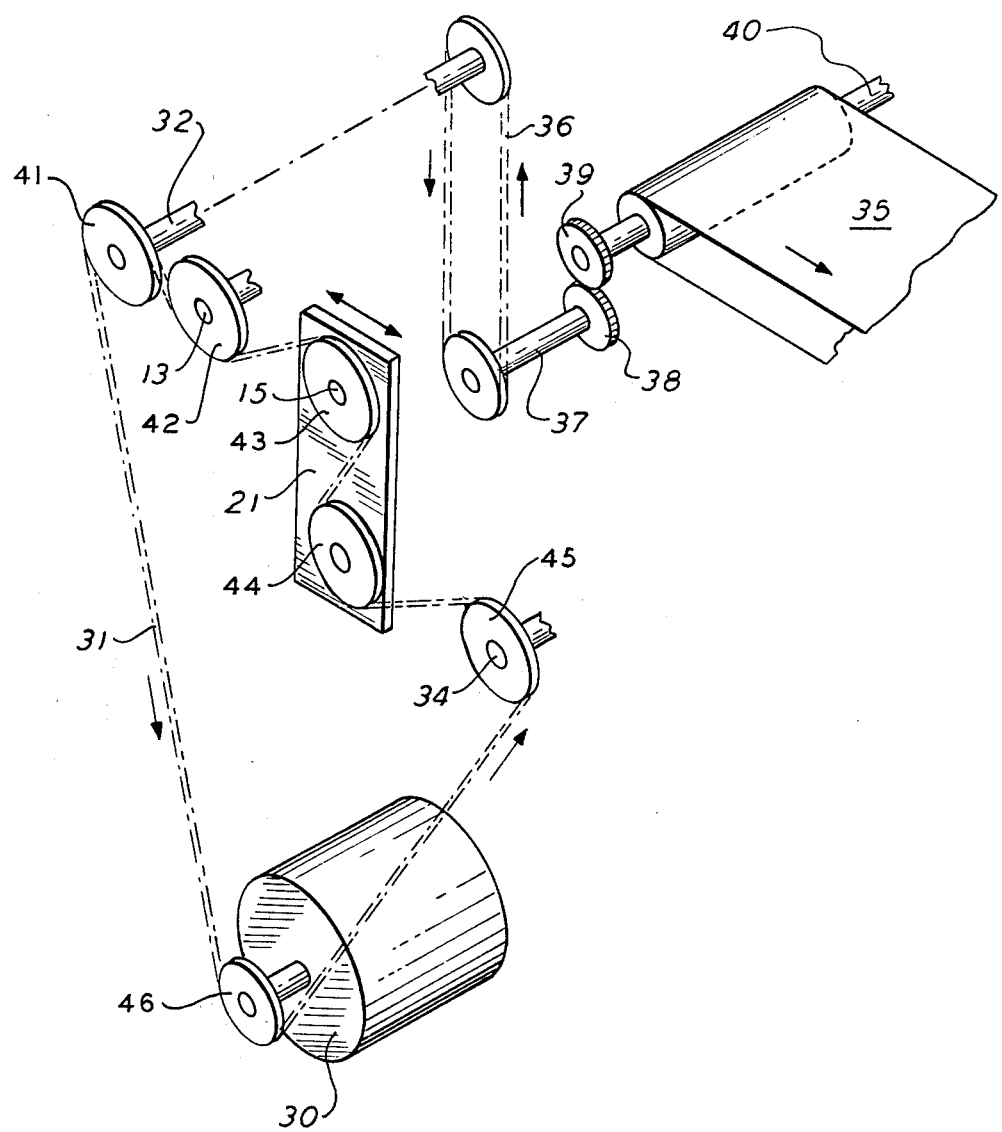

METHOD AND APPARATUS FOR MACERATING MEAT

RELATED APPLICATION

This application is a continuation in part of application Ser. No. 866,630 filed by the present applicants on Jan. 3, 1978, now abandoned.

BACKGROUND OF THE INVENTION

1. Field of Invention

This invention relates generally to macerating meat and particularly to methods and apparatus for macerating meat in which the meat is crushed and slitted by rotating blunt edge discs so that the slitting elements may enter the meat more deeply than if the meat had not been crushed; differential speed of discs enhances maceration by tearing.

2. Prior Art

There are numerous devices generally available for macerating meat. It is necessary to macerate meat because curing of a piece of meat proceeds more completely and rapidly if the curing agent can penetrate into the piece of meat through the macerations. Frequently, the macerating elements tend to expand the meat so that when the macerating elements are removed, the piece of meat contracts to its normal dimensions. The macerations are not sufficiently deep to permit a deep penetration of the curing agents. Thus when the macerating elements are projected against a piece of meat from opposite sides, the central core of the piece of meat becomes densified while the peripheral portions are being slit. When such a result occurs, the curing agents do no deeply penetrate to the central core of the meat which may thereupon be only partially cured. Other methods and apparatus are only adapted to macerate a piece of meat on one side and such pieces of meat must be turned and run through the macerator for a second time. Other apparatus makes no provision for handling pieces of meat having a different width and length and therefore cannot handle very large meat segments. Usually, the slitting elements rotate at the same identical rates.

SUMMARY OF THE INVENTION

It has been found that an apparatus can be devised which is adjustable and capable of handling large elongated pieces of meat as well as shorter pieces of meat. Furthermore, such apparatus is capable of macerating very wide pieces of meat and performing such job to very considerable depths of the meat for the reason that the meat is compacted in its width to less than its normal dimension and the macerating elements thus penetrate deeply into the meat, which when removed from the macerator is no longer compressed and resumes its normal size, yet having been penetrated in depths while it was compacted. Such apparatus also provides a pair of opposed macerating devices so that the meat is actually macerated from opposite sides and does not have to be twice passed through the macerator. Meat processed by the present apparatus is deeply macerated and may be more effectively cured to provide uniformity of the cured meat product. This is accomplished by a method in which the meat is intruded between a pair of rapidly revolving shafts arranged in parallelism with each other at a distance less than the normal widths of the pieces of meat to be macerated. The shafts are contra-rotating, downwardly from the top toward each other. Each shaft carries a plurality of slotted discs. The slots extend from the peripheral edge radially inwardly towards the center of the disc. The peripheral edge of the disc is blunt so as not to provide a neat sharp cutting of the meat but rather to macerate the meat. Separating the discs are generally circular rings spacing the discs apart and constituting crushers which encounter the macerated meat and compact it, crushing it toward the central axis of the piece of meat so that the discs which normally would only penetrate into the meat are now penetrating into the compacted crushed portion of the meat more deeply than if the meat were not subject to crushing pressure and compacted. A comb removes the macerated meat from the slotted discs after it passes below the shafts. When the blunt edge slotted discs revolve at differing rates, the slitting is enhanced by a tearing or ripping action which is surprisingly beyond the normal amount of maceration attained.

THE DRAWINGS

These objects and advantages as well as other objects and advantages may be obtained by the practice of the method and the use of the device shown in the drawings in which:

FIG. 3 is a partial side elevational view thereof; and

FIG. 4 is a perspective view of the drive-train.

PREFERRED EMBODIMENT

Figure 1:
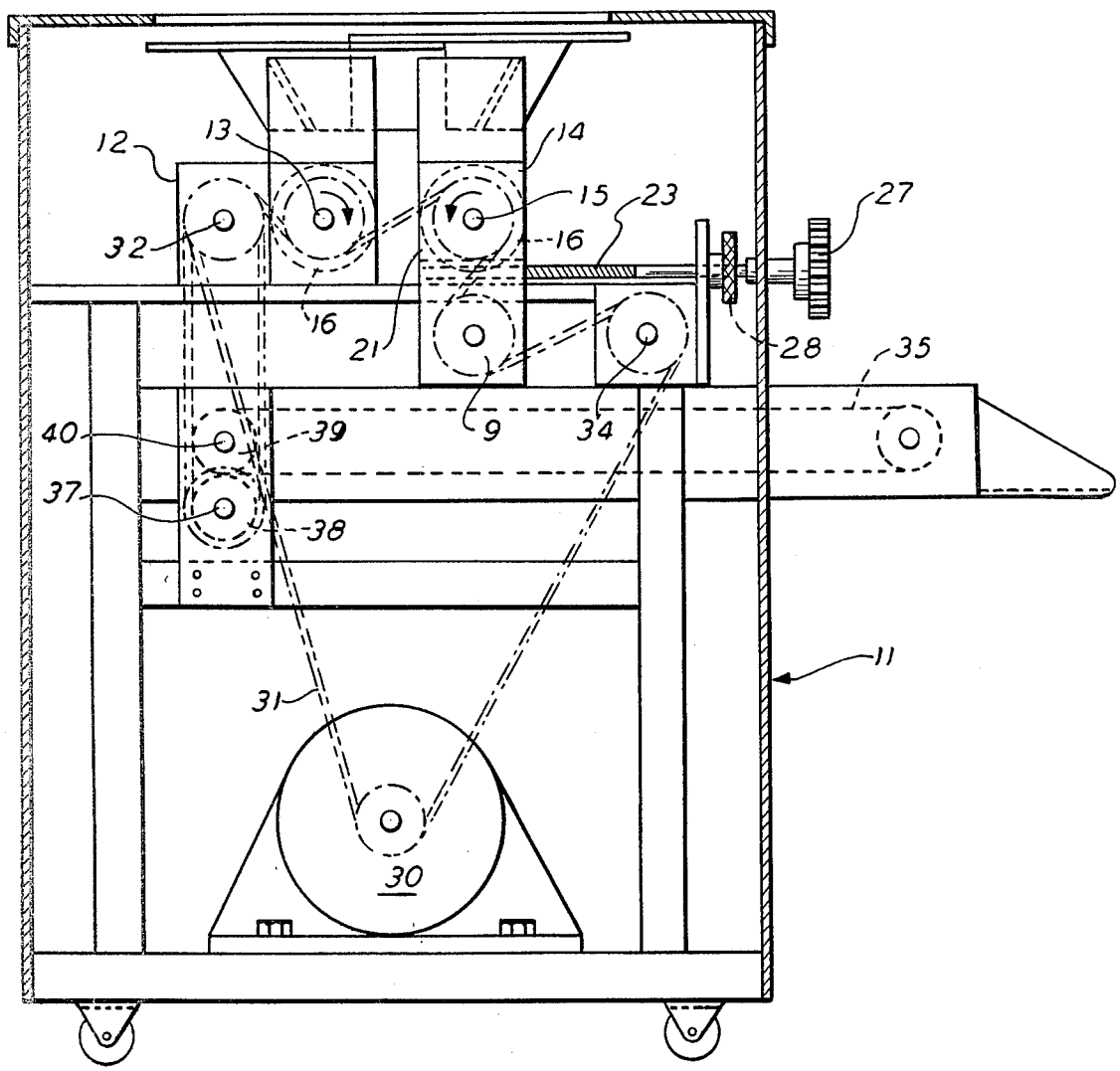
FIG. 1 is a side elevational view of the macerator.
Figure 2:
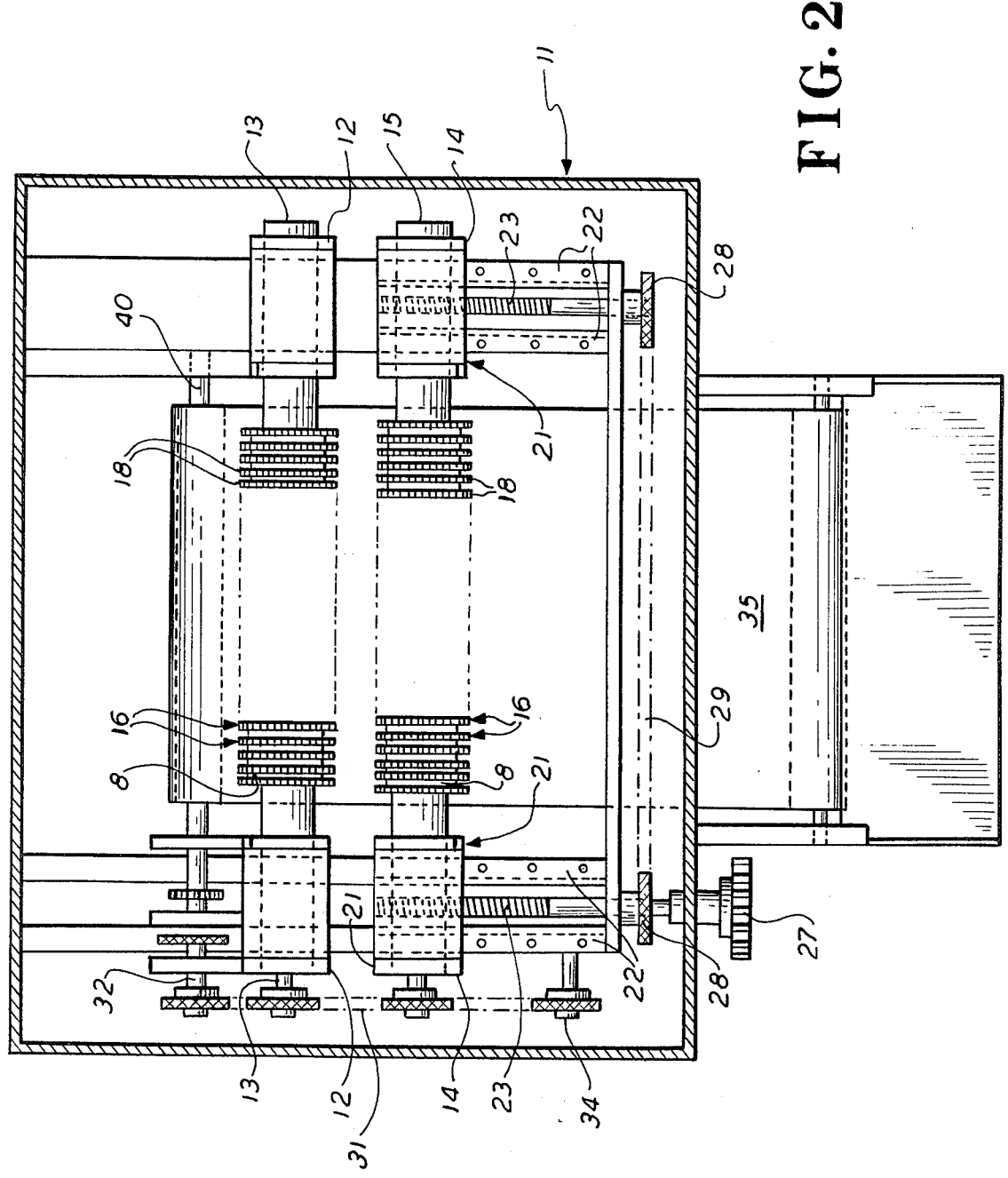
FIG. 2 is a top plane view thereof.

The macerator provides a frame 11 which is generally rectangular in form and has a pair of bearings 12, 12 at the top, on which is mounted a first shaft 13. A second pair of bearings 14, 14 are located on the top of the frame and serve to rotatably mount a second shaft 15. Both the first and second shafts 13, 15 carry a plurality of discs 16 which are rigidly secured thereto. The discs 16 are provided with short radial slots 17, generally U-shaped and extending from the periphery 18 of the disc, radially toward the center. The slots 17 are rather shallow and may be approximately one inch deep. The peripheral edges 18 on the discs are not sharpened for cutting but are generally flat or blunt so that when the edges 18 are applied to a piece of meat, they macerate it progressively as the edge is intruded deeper. The discs 16 on the first shaft 13 are offset from the discs 16 on the second shaft 15 so that they do not lie in the same vertical plane but are generally parallel to each other. Crusher rings 8 are mounted on the first and second shafts 13, 15 between the discs. These rings 8 each have a central orifice to correspond with the diameter of the shaft and they have a radial depth sufficient so that their periphery is generally at the deepest point in the slots 17, that is to say, the point of origin of the radial slots 17. A pair of combs 19, 19 are secured below each of the shafts 13, 15 with teeth 20 intruded between the adjacent discs 16 on the respective shafts whereby meat which has been crushed and slit is stripped out from between the adjacent discs.

The first shaft 13 is in a fixed position on the bearings 12, 12 and does not move from that position as it rotates. The second shaft 15 however is a movable shaft for the bearings 14, 14 are carried by mountings 21 which are slidable in the tracks 22. Threaded shafts 23 are mounted for rotating on the frame 11 and engage correspondingly threaded passages in the mountings 21 whereby the rotation of the threaded shafts 23 causes the advancing of the second shaft 15 toward the first shaft 13 or away from the first shaft 13. This is accomplished by a knob 27 mounted on one of the threaded shafts 23. Each of the threaded shafts 23 carries a sprocket 28 and a chain 29 is engaged with the sprockets 28 whereby both threaded shafts 23 simultaneously rotate to move the second shaft 15 constantly in general parallelism with the first shaft 13. The tracks 22 are limited so that the discs 16 on the second shaft and the discs 13 on the first shaft can only move to a vertical plane defining the peripheral edges of the discs on the first shaft 13 and the discs on the second shaft 15. The discs 16 can only move away from each other and can never overlap. Further, the discs 16 on the first shaft are not arranged coplanar with the discs 16 on the second shaft 15 but are staggered, or offset so that the discs 16 on one shaft are generally opposite the middle of the crusher rings 8 on the other shaft.

A motor 39 drives a chain 31 in order to accomplish the counter-rotating of the first shaft 13 with respect to the second shaft 15. The chain 31 from the motor 30 passes over a sprocket 41 on a conveyor drive shaft 32 and under a sprocket 42 on the first shaft 13. The chain then proceeds to engage a sprocket 43 on the second shaft 15 which is carried on the slidable mountings 21. Carried on the same slidable mounting 21 is a sprocket 44. The chain 31 passes under the sprocket 44 to another shaft 34 carrying a sprocket 45, from which the chain 31 returns to the drive sprocket 46 on the shaft of the motor 30. It will be seen that the movable mounting 21 accomplishes the engagement of the chain 31 with all of the sprockets despite the movement of the second movable shaft 15 toward or away from the first stationary shaft 13. Thus the operation of the macerator can be accomplished by adjusting the distance of the second shaft 15 from the first shaft 13 to accommodate between them pieces of meat of varying dimensions. While the macerator will operate very well when rotated at the same rate of speed of the shafts 13, 15, a remarkable improvement in maceration is attained by rotating them at different speeds. This may be accomplished by providing the sprockets 42, 43 with different amounts of teeth. For example, the sprocket 42 on the shaft 13 may be provided with 13 teeth to rotate the shaft at approximately 62.29 r.p.m. and the sprocket 43 may be provided with 15 teeth to rotate the shaft 15 at the rate of 74.75 r.p.m. In this manner, the maceration is not merely a slicing operation by the blunt edge discs 18, but is also a tearing or ripping operation. The degree of maceration attained is surprisingly greater than that attained by coequal relative rotation of the shafts 13, 15.

A conveyor 35 is mounted on the frame 11 below the shafts 13, 15. The conveyor 35 is driven by a chain 36 connected to the conveyor drive shaft 32, and to an intermediate shaft 37, on which is mounted a gear 38, engaging a second gear 39 carried by the conveyor shaft 40.

What is claimed is:

1. A method for macerating meat to effect deep penetration of the interior thereof comprising,
   (a) spacing a pair of shafts in general parallelism with each other at a distance less than the width of a piece of meat to be macerated,
   (b) contra-rotating the shafts,
   (c) mounting radially slotted discs with blunted peripheral and blunted radial edges on the shafts wherein the peripheral edges of the discs on the respective shafts are spaced apart to define a vertical plane therebetween,
   (d) mounting crushers on the shafts between the discs to space the slotted discs apart from each other, with the crushers' peripheries disposed generally at the commencement of the slots,
   (e) passing meat between the shafts in engagement with the crushers and the discs,
   (f) crushing the meat by engagement with the crushers as the meat passes between the shafts,
   (g) slitting the crushed meat by engagement of it with the slotted discs as it passes between the shafts, and
   (h) combing the meat out from between the discs after the meat has passed between the shafts.

2. The method according to claim 1 in which the contra-rotation of the shafts is conducted at different relative rates of rotation.

3. A macerator for macerating meat comprising,
   (a) a first shaft,
   (b) a second shaft,
   (c) a plurality of discs mounted on the shafts,
   (d) radial slots in the periphery of each disc,
   (e) blunted peripheral and blunted radial edges on each disc,
   (f) the discs on the first shaft offset with respect to the position of the discs on the second shaft, p1 (g) crusher rings mounted on the first and second shafts between the discs to urge the meat toward the discs on the opposite shaft,
   (h) the crusher rings on each shaft extending radially substantially to the point of origin of the radial slots in the discs,
   (i) combs positioned below each shaft,
   (j) the teeth of the combs intruded between the discs on the respective shafts whereby meat jammed between the adjacent discs is stripped away, and
   (k) the peripheral edges of the discs on one shaft normally extending toward a plane generally tangential to the edges of the discs wherein the peripheral edges of the discs on the first and second shafts are spaced apart to define a vertical plane therebetween.

4. A macerator comprising the device according to claim 3, and,
   (a) one of the shafts being stationary and mounted for rotation,
   (b) means for mounting the other of the shafts rotatably and movable to preselected distances away from the one shaft, and in parallelism thereto.

5. A macerator according to claim 3 comprising,
   (a) the first shaft being stationary and mounted for rotation,
   (b) the second shaft being movable and mounted for rotation in parallelism with the first shaft.

6. A macerator comprising an apparatus according to claim 5, and,
   (a) the means for mounting the other shaft movably in parallelism with the one shaft comprises,
      (1) mountings slidable in tracks,
      (2) threaded shafts engaged with each of the mountings,
      (3) sprockets mounted on the threaded shafts,
      (4) a chain engaging the sprockets,
      (5) a knob on one of the threaded shafts for rotating the threaded shafts.

7. A macerator according to claim 3 and a motor operatively connected to the first and second shafts.

8. A macerator according to claim 3 and a conveyor beneath the first and second shafts.

9. A macerator according to claim 3 and means mounted on the shafts, engaged with the means to drive the shafts, for driving them at different relative speeds.

10. A macerator according to claim 3 and means mounted on the shafts, engaged with the means to drive the shafts, for driving them at different relative speeds.

11. A macerator according to claim 4 and means mounted on the shafts, engaged with the means to drive the shafts, for driving them at different relative speeds.

12. A macerator according to claim 5 and means mounted on the shafts, engaged with the means to drive the shafts, for driving them at different relative speeds.

13. A macerator according to claim 6 and means mounted on the shafts, engaged with the means to drive the shafts, for driving them at different relative speeds.

14. A macerator according to claim 7 and means mounted on the shafts, engaged with the means to drive the shafts for driving them at different relative speeds.

15. A macerator according to claim 8 and means mounted on the shafts, engaged with the means to drive the shafts for driving them at different relative speeds.

* * * * *